Patented Aug. 30, 1938

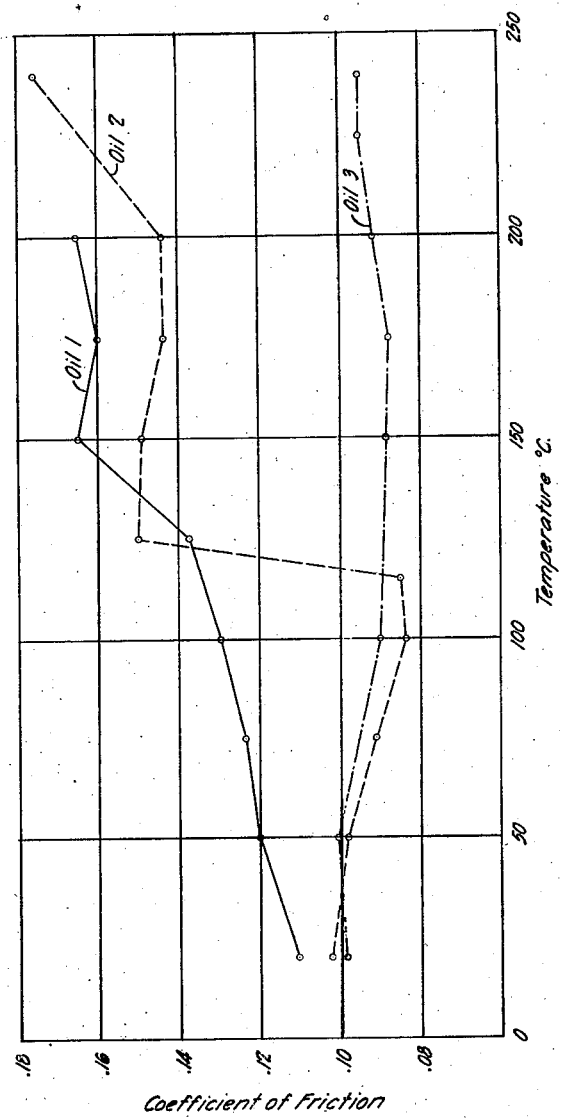

2,128,574

UNITED STATES PATENT OFFICE 2,128,574

PROCESS FOR LUBRICANT COMPOSITION

Adrianus Johannes van Peski and Willem Coltof, Amsterdam, Netherlands, assignors to Shell Development Company, San Francisco, Calif., a corporation of Delaware Application October 19, 1936, Serial No. 106,358 In the Netherlands October 31, 1935

5 Claims. (Cl. 87—9)

This invention relates to the production of improved lubricants comprising lubricating oils such as mineral lubricating oils to which has been added a small amount of an oxidized product derived by the partial oxidation of high molecular weight synthetic oils obtained by polymerization of lower molecular weight olefinic hydrocarbons.

It is known that organic acids and similar compounds produced by oxidizing relatively high molecular weight hydrocarbons such as lubricating distillates, scale wax, petrolatum, etc. are suitable for blending with mineral lubricating oils to improve the oiliness and anticorrosive properties of the latter. We have discovered that oxidized products which may have considerably higher average molecular weights than those derivable from natural hydrocarbons of relatively high molecular weight, can be produced by employing as a starting material synthetic hydrocarbons having an average molecular weight of above about 400 and preferably above 500 and that the oiliness-enhancing and anticorrosive effect of these high molecular weight oxidized products increases with increasing average molecular weight. The effect of oxidized products of a given average molecular weight prepared according to our invention being in general approximately the same as that of products of about equal molecular weight obtained by oxidation of natural hydrocarbons, it is generally preferred to start from synthetic hydrocarbons having average molecular weights appreciably exceeding 500 and amounting to about 1,000 or even higher and to produce therefrom by careful oxidation products which possess considerably higher average molecular weights than the products obtainable by oxidation of the highest molecular natural hydrocarbon materials and which have also a greater oiliness-enhancing and anti-corrosive action.

Suitable synthetic hydrocarbons are produced from olefinic hydrocarbons of lower molecular weight, for instance, by polymerizing olefines such as ethylene, propylene, butylene, isobutylene, etc. and particularly heavier olefines having at least ten carbon atoms of straight chain type, although branched chain or cyclic olefines may also be used, as well as cracked distillates containing such olefines and preferably obtained by vapor phase cracking of suitable hydrocarbons as kerosene, gas oil, paraffin wax; di-olefines and hydrocarbons capable of addition of chlorine generally, in the presence of suitable polymerization catalysts, for instance aluminum chloride, boron fluoride, zinc chloride, ferric chloride, adsorptive clays, etc.; or by condensation of di-olefines with cyclic, particularly aromatic hydrocarbons; or by some other means, as voltolization.

The oxidation of the synthetic hydrocarbons may be effected by any known method, for instance by introducing into the synthetic hydrocarbon mixture oxygen, air, or other oxygen-containing gas, ozone, chromic acid, permanganate, hydrogen peroxide, nitric oxide, etc. If desired, the reaction may be carried out in the presence of catalysts such as alkali carbonates or hydroxides; or metals, oxides, and salts, preferably oil-soluble salts as oleates, stearates, sulfonates, naphthenates, resinates, etc., of copper, lead, vanadium, molybdenum, chromium, manganese, iron, nickel, cobalt, etc.

The temperature of the oxidation treatment may vary a great deal depending upon the oxidation medium used. The temperature should be sufficiently high to enable the oxidation of a substantial portion of the synthetic hydrocarbons to acid-reacting compounds, hereinafter designated as synthoxy-acids, of average molecular weights higher than those of the synthetic hydrocarbons at a fair rate, and yet it should be low enough substantially to avoid breakdown of the hydrocarbons to compounds of lower molecular weights. Usually the formation of a small amount of low boiling oxy-hydrocarbons such as formaldehyde, formic acid, acetic acid, etc. cannot be prevented entirely. In general we prefer to carry out the oxidation at an elevated temperature below about 200° C.

Our preferred method of oxidation comprises passing a stream of oxygen, air or other diatomic oxygen-containing gas through the hydrocarbons at a temperature between about 150° to 200° C. over an extended period of time, preferably in the presence of some oxidation catalyst.

The oxidized hydrocarbons normally constitute dark-colored masses. If desired they may be added to mineral lubricating oils in their raw state. We prefer, however, to separate from the oxidized mass the high molecular weight synthoxy-acids which we have identified as the active oiliness and anti-corrosive ingredients.

The separation of the synthoxy-acids may be performed in any known manner. A convenient way consists of saponifying the oxidized mass with alcoholic caustic, separating the soap solution so obtained from the unsaponifiable portion, and liberating the synthoxy-acids from the soap by acidifying the latter, preferably with a strong mineral acid, as hydrochloric or sulfuric acids. Or the oxidation product may be extracted with a lower alcohol, or ketone, or the like, which has a preferential solvent action for the saponifiable matter in the mass. If desired, the extraction may be carried out with a solvent pair of solvents which are only partially miscible, or substantially immiscible, with each other, such as phenol and light naphtha, the phenol being a selective solvent for the saponifiable matter and the naphtha for the non-saponifiable matter.

As stated hereinbefore, the purified synthoxy-acids, which are prepared in accordance with our invention, are highly active as oiliness and anti-corrosive dopes; they normally possess an average molecular weight above 500, and preferably from about 700 to 900. Wherever in the present specification reference is made to average molecular weights, these have been determined by the method of depression of the freezing point in naphthalene.

The acid values of the synthoxy-acids vary in general between about 120 and about 165 and the hydroxyl content (including the hydroxyl group of the carboxyl groups) from about 4.8 to about 6.5% by weight.

The synthoxy-acids may be separated into a part soluble in aromatic-free gasoline and a part insoluble therein. The gasoline-insoluble acids, which may have hydroxyl contents as high as about 20, have a markedly lower oiliness-improving effect than the gasoline-soluble acids and are only slightly soluble in mineral lubricating oils. On the other hand the gasoline-soluble synthoxy-acids are soluble in mineral lubricating oils to a considerable extent, usually in excess of 10% by weight, and are preferred for the purposes of our invention, although the total acids may also be used as oiliness-improving and anti-corrosive compounds.

The quantities of synthoxy-acids which need be added to lubricating oils to effect a substantial improvement are usually of the order of 1% by weight of the lubricating oil or less. As a general rule, amounts between about .1 to 10% may be added, depending upon the results desired.

The superiority of our high molecular synthoxy-acids for oiliness compounds over similar, but lower molecular, compounds obtained from natural products such as paraffin wax is well demonstrated in the tests presented graphically in the attached drawing in which the change of coefficient of friction with the temperature is shown for three oils. Oil 1 is a hydrocarbon lubricating oil containing no added material. Oil 2 contains 1% of purified acids having an average molecular weight of about 300 produced by oxidation of paraffin wax. Oil 3 contains 1% of purified synthoxy-acids of an average molecular weight of about 750 produced according to our invention from a synthetic hydrocarbon oil of the type hereinbefore described.

As will be noted, the coefficients of friction for oils 2 and 3 are almost the same at low temperatures below about 115° C. Above this temperature, however, the paraffin acids have practically no oiliness-enhancing effect while that of the synthoxy-acids persists substantially undiminished up to temperatures of 240° C. and higher.

The importance of good oiliness at elevated temperatures is evident. While in the average bearing, for instance in an internal combustion engine, prevailing average temperatures are not in excess of about 100° C., frequently much higher temperatures exist locally due to an uneven load distribution within the bearing. Moreover it is well known that the value of high oiliness in lubricating oils becomes apparent mainly under conditions of boundary lubrication, and when boundary lubrication replaces full fluid lubrication, bearing temperatures usually rise considerably above normal. Therefore in actual lubrication practice good oiliness is most important at temperatures considerably in excess of normal bearing temperatures, i. e., above 100° C., and an oiliness compound that loses its effect at temperatures just above 100° C. is of little, if any, value.

Our synthoxy-acids may also be used in grease making, either in the form of free acids or soaps, depending on the type of grease used. For instance soda salts of our acids may be used alone or in combination with fatty and/or naphthenic soda soaps to produce special soda soap greases. Or the free acids and/or their aluminum soaps may be incorporated into an aluminum soap grease, thereby not only improving the oiliness of the latter but also stabilizing the same.

An illustrative example of a method to produce our synthoxy-acids follows. A cracked distillate boiling between about 100° and 300° C. obtained by vapor phase cracking of paraffin wax was polymerized with aluminum chloride to produce an oil having an average molecular weight of 580 and a Saybolt Universal viscosity of 340 seconds at 50° C.

Five kilograms of this oil were oxidized at a temperature of 170° C. by passing 200 liters of air per hour therethrough over a period of 216 hours. This period can be considerably reduced by carrying out the oxidation in the presence of a suitable catalyst, e. g., manganese resinate. An oxidized oil was obtained having a Saybolt Universal viscosity of 2400 seconds at 50° C. and an average molecular weight of 810. From this oxidized oil synthoxy-acids were separated by refluxing the oil for six hours with an excess of 1-normal methyl alcoholic potassium hydroxide and a quantity of pentane to produce separate oily and alcoholic layers of about equal specific gravities. At the end of the refluxing period water was added to effect a segregation of the layers.

The aqueous alcoholic layer was separated and the alcohol evaporated whilst simultaneously adding water. The resulting aqueous solution was extracted with pentane to remove oily non-saponified matter, and the de-oiled aqueous solution was then acidified with sulfuric acid. The synthoxy-acids were thereby liberated and were recovered. The yield of purified synthoxy-acids was 12.5% of the polymerized oil. The acids had an average molecular weight of 765.

When dissolving a small quantity of this product in a lubricating oil, the coefficient of friction and the anti-corrosive properties of the latter were materially improved.

We claim as our invention:

1. A composition comprising a substantial amount of a hydrocarbon lubricant containing from .1 to 10% of a synthetic organic acid having an average molecular weight greater than those of acids obtainable by oxidation of high molecular weight natural hydrocarbons, said synthetic acid being an oxidation product of a high molecular weight synthetic hydrocarbon oil obtained by polymerization of olefines.

2. A composition comprising a substantial amount of a hydrocarbon lubricant containing a small amount of a synthetic organic acid having an average molecular weight greater than those of acids obtainable by oxidation of paraffin wax, said synthetic acid being an oxidation product of a high molecular weight synthetic hydrocarbon oil obtained by polymerization of olefines.

3. A composition comprising a substantial amount of a hydrocarbon lubricant containing a small amount of a synthetic organic acid having an average molecular weight greater than those of acids obtainable by oxidation of high molecular weight natural hydrocarbons, said synthetic acid having an acid value between 120 and 165, a hydroxyl content of 4.8 to 6.5%, and being an oxidation product of a high molecular weight synthetic hydrocarbon oil obtained by polymerization of olefines.

4. A composition comprising a substantial amount of a hydrocarbon lubricant containing a small amount of a synthetic organic acid having an average molecular weight greater than those of acids obtainable by oxidation of high molecular weight natural hydrocarbons, said synthetic acid being an oxidation product of a high molecular weight synthetic hydrocarbon oil having a molecular weight above 1000.

5. A compounded lubricating oil having a coefficient of friction lower than that of straight hydrocarbon lubricating oils over a temperature range from normal atmospheric to about 200° C., consisting essentially of a mineral lubricating oil containing from .1 to 10% dissolved organic acid, having a molecular weight greater than those of acids obtainable by oxidation of high molecular weight natural hydrocarbons, said dissolved acid having an acid value between 120 to 165, a hydroxyl content of 4.8 to 6.5%, and being an oxidation product of a synthetic hydrocarbon oil of molecular weight above 1000, obtained by polymerization of olefines.

ADRIANUS JOHANNES VAN PESKI.
WILLEM COLTOF.